US006842305B2

(12) United States Patent
Molstad et al.

(10) Patent No.: US 6,842,305 B2
(45) Date of Patent: Jan. 11, 2005

(54) TIME-BASED SERVO FOR MAGNETIC STORAGE MEDIA

(75) Inventors: Richard W. Molstad, St. Paul, MN (US); Michael J. Kelly, Erin Prairie Township, WI (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 170 days.

(21) Appl. No.: 10/369,908

(22) Filed: Feb. 17, 2003

(65) Prior Publication Data

US 2003/0123179 A1 Jul. 3, 2003

Related U.S. Application Data

(62) Division of application No. 09/265,789, filed on Mar. 10, 1999, now Pat. No. 6,542,325.

(51) Int. Cl.[7] .............................. G11B 5/584; G11B 5/09; G11B 21/02
(52) U.S. Cl. .................... 360/77.12; 360/48; 360/75
(58) Field of Search ............................. 360/17, 48, 75, 360/77.12, 78.02, 119, 125, 121

(56) References Cited

U.S. PATENT DOCUMENTS

| | | | |
|---|---|---|---|
| 3,665,118 A | 5/1972 | Cooper, Jr. | |
| 3,869,711 A | 3/1975 | Bernard et al. | |
| 4,007,493 A | 2/1977 | Behr et al. | |
| 4,149,198 A | 4/1979 | Behr et al. | |
| 4,321,634 A | 3/1982 | Lehureau | |
| 4,347,534 A | 8/1982 | Kimura | |
| 4,454,549 A | 6/1984 | Pennington | |
| 4,549,232 A | 10/1985 | Axmear et al. | |
| 4,587,579 A | 5/1986 | Cocke et al. | |
| 4,595,327 A | 6/1986 | Woodley | |
| 5,003,412 A | 3/1991 | Bizjak et al. | |
| 5,055,951 A | 10/1991 | Behr | |
| 5,119,248 A | 6/1992 | Bizjak et al. | |
| 5,132,861 A | 7/1992 | Behr et al. | |
| 5,223,994 A | 6/1993 | Behr et al. | |
| 5,293,281 A | 3/1994 | Behr et al. | |
| 5,689,384 A | * 11/1997 | Albrecht et al. | ......... 360/77.12 |
| 5,930,065 A | 7/1999 | Albrecht et al. | |
| 6,111,719 A | 8/2000 | Fasen | |

FOREIGN PATENT DOCUMENTS

EP           690442 A2      1/1996

OTHER PUBLICATIONS

R. C. Barrett et al., "Timing–Based Track–Following Servo for Linear Tape Systems," *IEEE Transactions on Magnetics*, 34:4 1872–1877 (1998).
R. C. Barrett et al., "Timing–Based Track–Following Servo for Magnetic Tape," p. EC–06 of *1996 Digest of Intermag '96*, 1996 IEEE International Magnetics Conference, Apr. 9–12, 1996, Seattle, WA.
E. G. Gruss et al., "Servo System for Magnetic Recording Based on Time Comparison," *IBM Technical Disclosure Bulletin*, 23:2 787–789 (1980).

* cited by examiner

Primary Examiner—W. R. Young
Assistant Examiner—Adam Giesy
(74) Attorney, Agent, or Firm—Eric D. Levinson

(57) ABSTRACT

A servo track configuration includes at least one servo track having a width. A servo pattern is repeatedly recorded in the at least one servo track. Repeatedly recording the servo pattern includes repeating the simultaneous recording of first and second reference pattern lines and a track pattern line in the at least one servo track. Each of the first and second reference pattern lines has an identical predetermined geometry and extends across the width of the at least one servo track. Further, the track pattern line has a predetermined geometry that is different than the predetermined geometry of the first and second reference pattern lines and extends across the width of the at least one servo track.

18 Claims, 10 Drawing Sheets

TIME-BASED SERVO FOR MAGNETIC STORAGE MEDIA

This is a divisional of application Ser. No. 09/265,789, filed on Mar. 10, 1999, now U.S. Pat. No. 6,542,325.

FIELD OF THE INVENTION

The present invention relates generally to recording and reading data from magnetic storage media. More particularly, the present invention pertains to time-based servo for positioning a head relative to one or more tracks of magnetic storage media.

BACKGROUND OF THE INVENTION

Data storage in magnetic storage media systems, e.g., a linear tape storage system, has arrived at the point where progress in density requires implementation of track following servo systems to allow narrower data tracks. For example, tape products without servo generally operate with far fewer tracks per cm than systems which utilize servo technology.

The recording and reading of data in tracks on magnetic storage media requires precise positioning of magnetic read/write heads. The read/write heads must be quickly moved to and centered over particular tracks as recording and reading of data is performed. The heads can record and read data as relative movement occurs between the heads and the magnetic storage media in a transducing direction, e.g., the movement of tape in a tape cartridge across a read/write head. The heads are moved from track to track across the width of the tape in a translating direction which is perpendicular to the transducing direction.

Generally, magnetic storage media devices that read and record data on magnetic media use servo control systems to properly position the data read/write heads in the translating direction, e.g., across the width of the tape, perpendicular to the transducing direction, e.g., a direction coincident with the length of the tape. The servo control system generally provides a position signal from one or more servo read heads that read cross width position control information recorded in one or more servo tracks on the magnetic storage media.

Conventional servo systems generally fall into a category referred to as boundary systems in which at least one servo track or servo track pattern extending along the length of the magnetic media, e.g., tape, is laterally divided into two or more regions, separated by linear boundaries. The distinct regions have different properties which can be detected by the servo read head. For example, the regions may be recorded at different frequencies or phases, or they may contain bursts occurring at distinct times. Generally, for example, the servo head elements straddle the boundary between the regions, and the ratio of the amplitude of the response of the servo head to each region provides the position signal upon which the track following servo operates.

Such boundary type servos and tape systems are particularly susceptible to errors in the position signal. For example, to provide sufficient lateral dynamic range, servo read head elements tend to be approximately as wide as a full servo track width. Servo head instabilities, head wear, localized debris on the head or tape, and media defects all contribute to temporary or long-term shifts in the spatial response of the servo head to the recorded servo pattern in the servo track.

To address the problems associated with boundary type servos in which such systems are particularly susceptible to errors in the position signal as described above, time-based servo systems for magnetic storage media have been described. U.S. Pat. No. 5,689,384 to Albrecht, et al., entitled "Timing Based Servo System For Magnetic Tape Systems," issued 18 Nov. 1997, describes a track following servo control system for use with magnetic media tape systems which derives head position information from one or more specially patterned servo tracks. The servo patterns are comprised of magnetic transitions recorded at more than one azimuthal orientations in a servo track, such that the timing of the servo position signal pulses derived from reading the servo pattern are decoded to provide a position signal used by the servo system to position data heads over desired data tracks of the storage media.

For example, the servo pattern described in U.S. Pat. No. 5,689,384 may comprise straight transitions essentially perpendicular to the length of the track alternating with azimuthally inclined or sloped transitions. That is, the azimuthally included or sloped transitions may extend across the width of a track at an angle to the head transducing direction. The relative timing of transitions read by the servo read head varies linearly depending on the head position with respect to the center of the servo track. A position signal is generated by determining the ratio of two timing intervals. In particular, the ratio can be determined by normalizing the variable time interval between dissimilar transitions with the interval measured between like transitions. A read head that is narrow with respect to the width of the servo track pattern and the data track width can be used.

Such a time-based servo has numerous advantages over boundary servo systems. For example, such a time-based servo generally addresses the disadvantages associated with the use of wide servo read heads. However, such time-based servo systems, depending upon the type of time-based servo pattern recorded in the servo track and the method of recording such a time-based servo pattern, may be sensitive to tape speed variations at the time the servo pattern is recorded in the servo track. Because of the need to control tape speed variations when recording time-based servo patterns, specialized equipment which includes special speed control features is generally necessary to perform such time-based servo recording. As such, the time based servo recording process becomes complex and expensive. Further, during playback of data recorded on such magnetic storage media, the time-based servo, depending upon the type of servo pattern recorded in the servo track, may be sensitive to transverse tracking variations, e.g., across the width of the servo track.

SUMMARY OF THE INVENTION

A method of providing a servo track configuration according to the present invention includes providing at least one servo track with the at least one servo track having a width. A servo pattern is repeatedly recorded in the at least one servo track. Repeatedly recording the servo pattern includes repeating the simultaneous recording of first and second reference pattern lines and a track pattern line in the at least one servo track. Each of the first and second reference pattern lines has an identical predetermined geometry and extends across the width of the at least one servo track. Further, the track pattern line has a predetermined geometry that is different than the predetermined geometry of the first and second reference pattern lines and extends across the width of the at least one servo track.

In various embodiments of the method, providing the at least one servo track may include providing at least one servo track along at least a portion of the length of a tape, providing the at least one servo track may include providing at least one servo track continuously along the length of the tape; and simultaneous recording of the first and second reference pattern lines and the track pattern line may include recording the track pattern line between the first and second reference pattern lines, may include recording the first and second reference pattern lines adjacent to one another, may include recording parallel pattern lines extending across the width of servo track, may include recording parallel first and second servo reference pattern lines that are orthogonal to a center line of the servo track extending along a length thereof, or may include recording a sloped track pattern line forming an angle with the center line of the servo track.

A servo control system for positioning a magnetic head adjacent a surface of a moving magnetic storage medium is also provided. The system includes a head assembly having a servo read head for reading a repeated servo pattern recorded in a servo track of the storage medium and generating a read head signal representative of the servo pattern. A servo decode circuit receives the read head signal and generates a position signal based on the read head signal that indicates the position of the servo read head relative to the servo pattern. The system further includes a positioning actuator for positioning the head assembly relative to the storage medium and a controller that activates the positioning actuator as a function of the position signal. The servo decode circuit receives the read head signal generated from the repeated servo pattern as the servo read head is moved in a transducing direction along the storage medium. The servo pattern includes a first servo pattern reference region and a second servo pattern reference region. Each of the first and second servo pattern reference regions include at least one reference pattern line having a predetermined geometry extending across a width of the servo track. The predetermined geometry of the reference pattern lines in the first and second servo pattern reference regions are identical. The servo pattern further includes a servo pattern track region. The servo pattern track region includes at least one track pattern line having a predetermined geometry extending across the width of the servo track. The predetermined geometry of the at least one track pattern line in the servo pattern track region is different than the predetermined geometry of the reference pattern lines in the first and second servo pattern reference regions. The servo decode circuit determines a time interval between reference pattern lines in the first and second servo pattern reference regions and determines a time interval between the at least one track pattern line in the servo pattern track region and a reference pattern line in at least one of the servo pattern reference regions to generate the position signal.

A servo tracking data recording tape according to the present invention includes at least one data track extending along at least a portion of the length of the tape and at least one servo track extending along at least a portion of the length of the tape. The at least one servo track has a track width orthogonal to the length of the tape. Further, the at least one servo track includes a servo pattern repeated along at least the portion of the length of the tape. The servo pattern includes a first servo pattern reference region and a second servo pattern reference region. Each of the first and second servo pattern reference regions includes at least one reference pattern line having a predetermined geometry extending across the width of the servo track. The predetermined geometry of the reference pattern lines in the first and second pattern reference regions are identical. The servo pattern further includes a servo pattern track region. The servo pattern track region includes at least one track pattern line having a predetermined geometry extending across the width of the servo track. The predetermined geometry of the at least one track pattern line in the servo pattern track region is different than the predetermined geometry of the reference pattern lines in the first and second servo pattern reference regions.

In one embodiment of the tape, each of the first servo pattern reference region and the second servo pattern reference region include a plurality of reference pattern lines extending across the width of the servo track. The predetermined geometry of each of the plurality of reference pattern lines in each of the first and second pattern reference regions is the same. Further, the servo pattern track region includes a plurality of track pattern lines extending across the width of the servo track with the predetermined geometry of each of the plurality of track pattern lines in the servo pattern track region being the same.

A system for recording servo track information according to the present invention within a servo track extending along at least a portion of the length of a tape is also provided. The servo track has a track width orthogonal to the length of the tape. The system includes a servo write head. The servo write head includes a first and second reference write gap. Each of the first and second reference write gaps have substantially identical predetermined geometries. The servo write head further includes a track write gap. The track write gap has a predetermined geometry different than the predetermined geometry of the first and second reference write gaps. The system further includes means for moving the servo track of the tape and the servo write head relative to one another. The servo read head is selectively energized such that during energization first and second reference pattern lines and a track pattern line of a servo pattern are simultaneously recorded in the servo track. The first and second reference pattern lines are recorded by the first and second reference write gaps, respectively, across the width of the servo track and the track pattern line is recorded by the track write gap across the width of the servo track.

A servo write head apparatus for recording servo information in a servo track according to the present invention includes a head body and a first and second reference write gap defined in the head body. The length of each of the first and second write gaps allows for altering the state of the servo track across a width thereof Each of the first and second reference write gaps have substantially identical predetermined geometries. Further, a track write gap is defined in the head body. The track write gap has a length allowing for altering the state of the servo track across the width thereof The track write gap has a predetermined geometry different than the predetermined geometry of the first and second reference write gaps.

In various embodiments of the servo write system and servo write head apparatus, the track write gap may be located between the first and second reference write gaps, the first and second reference write gaps may be adjacent one another, the first and second reference write gaps may be parallel gaps, and the track write gap may be formed at an angle relative to the first and second reference write gaps.

A system and method for recording time-based servo track information within a servo track of tape in a tape cartridge is also provided according to the present invention. For example, this allows field erasure and servo recording for time-based servo as opposed to factory servo writing.

DETAILED DESCRIPTION OF THE EMBODIMENTS

Figure 1:
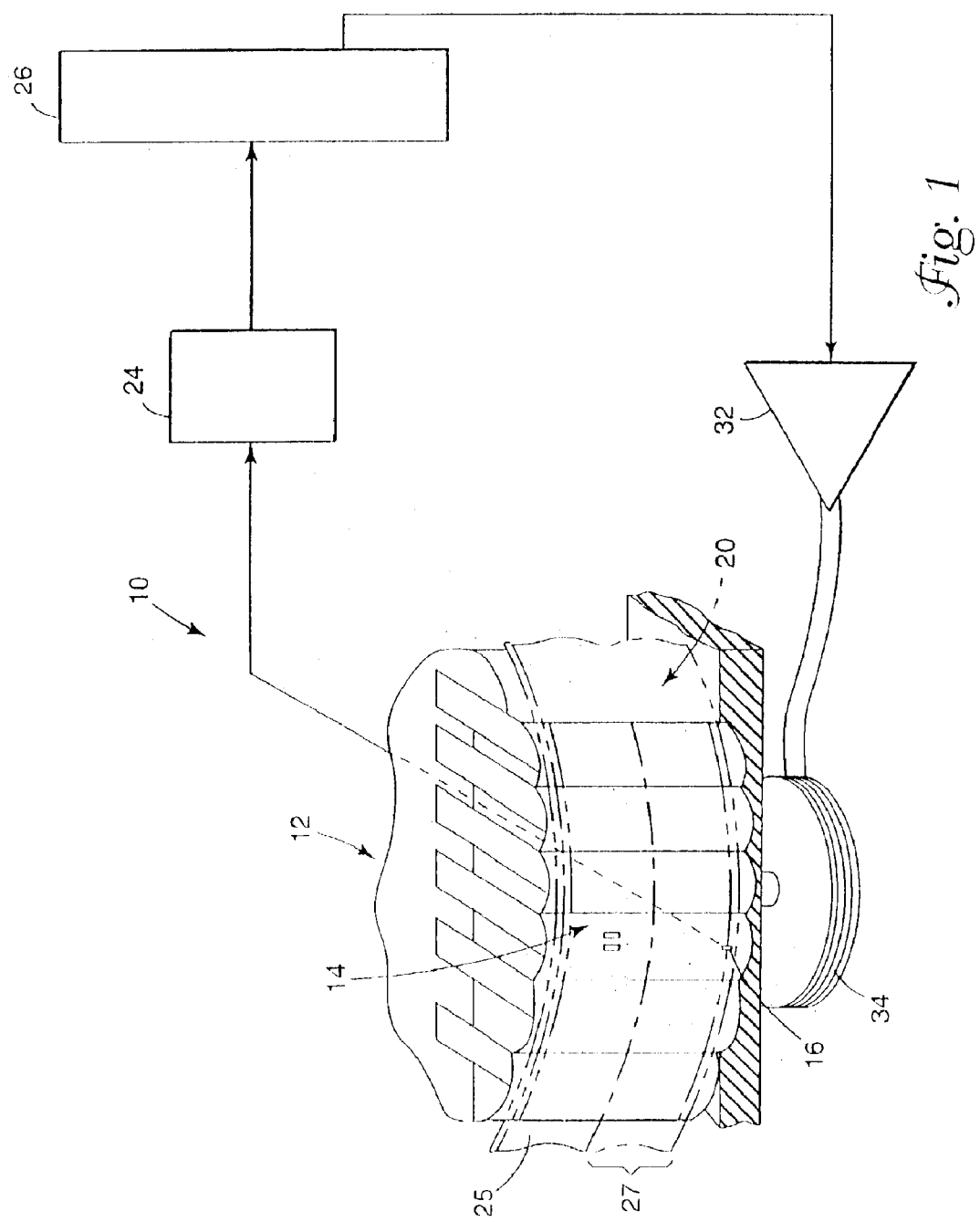
FIG. 1 is a simplified graphical illustration of a servo control system.

The present invention shall be described with reference to FIGS. 1–10. FIG. 1 generally shows a servo tracking system 10. The servo tracking system 10 includes head assembly 12 positioned relative to tape 20. Generally, tape 20 includes servo track 27 and a data band 25 including one or more data tracks. The head assembly 12 includes servo read head 16 for use in reading the servo track 27 to provide position information signals. The servo read head 16 provides signals representative of the position of the head assembly 12 relative to the tape 20, e.g., position of the servo read head 16 relative to the servo track 27 being read. The position information signal from the servo read head 16 is provided to servo read and decode circuitry 24. Head assembly 12 further includes data read/write heads 14 for reading and/or writing information from/to one or more data tracks in the data band 25 of tape 20.

Servo read and decode circuitry 24 decodes the position information signal provided from the servo read head 16 and provides a position error signal to processing unit 26 representative of the position of the head assembly 12 relative to the tape 20. The position error signal provided to processing unit 26 is a signal generated as a function of the servo pattern recorded in the servo track, e.g., a servo pattern of magnetic flux transitions.

The decoded information is then interpreted by the processing unit 26 and utilized as desired by the tracking system 10. Generally, such information is used in generating an actuation signal for use in positioning the head assembly 12 relative to the tape 20. For example, in the case of a single servo track such as shown in FIG. 1, the servo read and decode circuitry 24 generates an output representative of the position of the servo read element 16 relative to a servo track 27 of the magnetic tape 20 for use by processing unit 26. The processing unit 26 generates an actuation command based on the output of the servo read and decode circuitry 24. The servo read and decode circuitry 24 may include any circuitry, hardware, and/or software suitable for decoding information signals generated by the servo read head 16 reading servo tracks including servo patterns as described herein.

The head assembly 12 is positioned relative to tape 20 by positioning actuator 34 in response to the actuation command from processing unit 26. The positioning actuator 34 positions the head assembly 12 such that a desired alignment of the head assembly 12 relative to the magnetic tape 20 is achieved. The actuation command may be conditioned by conditioning circuitry 32, such as an amplifier or compensation filter, prior to application to positioning actuator 34. Such positioning aligns the servo read element 16 with respect to the servo track 27 and positions data read/write elements 14 for reading/writing data from/to data tracks within data band 25 of tape 20.

Generally, the servo tracking system 10 can employ various configurations of servo read elements and data read/write elements. For example, servo read elements may be positioned along the same gap lines or along different gap lines as the data read/write elements. Further, the various techniques described herein may be implemented for use with multiple servo read elements as opposed to a single servo read element. The present invention is not particularly concerned with the type of servo read or write elements used as long as they are suitably configured for reading and recording servo patterns in the servo tracks as described herein. As such, the head assembly 12 may be of various configurations, as would be readily apparent to one skilled in the art.

The servo control system 10 is generally part of or associated with a tape drive that accepts a tape cartridge containing a loop of the magnetic tape 20. For example, the tape drive may include a receiving slot into which such a tape cartridge is inserted. The tape drive is generally connected to a host processor. The host processor may be, for example, a personal computer such as an IBM Corporation "PS-2" personal computer, a workstation, or a minicomputer. For example, the tape drive may be a drive compatible with the host processor and tape library systems that employ tape cartridges, such as IBM Corporation "3480" and "3490" drive units. Further, for example, tape 20 may be part of a tape cartridge such as any one of a variety of cartridge formats, including, for example, conventional 8 millimeter, 4 millimeter, one-quarter inch, and one-half inch tape cartridge formats.

Figure 2:
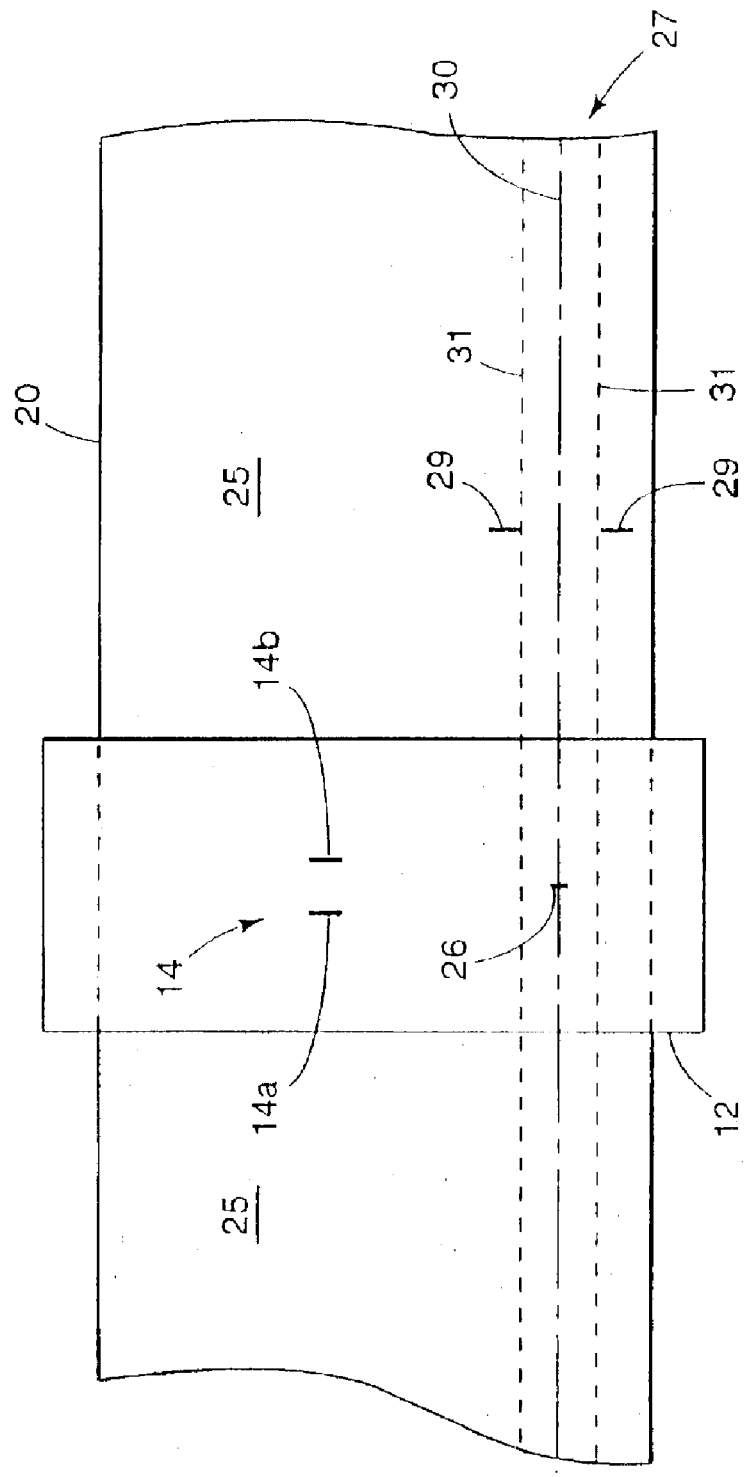
FIG. 2 is a schematic representation of a magnetic head and tape configuration such as for use in the system illustrated in FIG. 1.

FIG. 2 is an illustrative view looking at one side of the magnetic tape 20 from the side of head assembly 12. The tape 20 is shown in phantom with dashed lines where it passes beneath the head assembly 12. The head assembly 12 is shown in solid lines and includes relatively narrow servo read head 26 that provides an information signal representative of the servo pattern recorded in servo track 27 according to the present invention. In addition to the head assembly 12 including a relatively narrow servo read head 16 to detect a servo pattern recorded in the servo track 27 of the tape 20, the head assembly, for purposes of illustrating relative size, includes a data read head 14a and a data write head 14b. The data read/write heads 14 are positioned over a data band 25 of the tape 20 which contains multiple data tracks for reading/writing data from/to the data tracks.

FIGS. 1 and 2 show a single servo read head 26, a single servo track 27, and single data read 14a and write heads 14b. Those skilled in the art will appreciate that most tape systems have multiple servo tracks, multiple servo read heads, and multiple data read/write heads. For simplicity, the present invention is described herein using only the single servo read head 26, the single servo track 27, and the single data read head 14a and write head 14b. As such, the present invention is not limited to the use of this simplified illustrative configuration described herein.

Generally, tape 20 according to the present invention includes a repeating servo pattern of magnetic flux transitions that are recorded in at least one servo track 27 that extends along the length of the magnetic tape 20. The servo track 27 has a width 29 that extends across the servo track 27 orthogonal to the length of the tape 20. As shown in FIG. 2, the servo track 27 includes a center line 30. The center line 30 extends along the length of the tape 20 centered between the generally parallel edges 31 of the servo track 27.

FIG. 2 further shows that the servo read head 26 is relatively narrow and has a width substantially less than the width 29 of the servo track 27. In particular, in a preferred embodiment of servo read head 26, the servo read head 26 has a width that is less than one-half the width of a single data track (not shown). Generally, data tracks are narrow compared to servo tracks.

Typically, the transducing direction of tape movement relative to the head assembly 12 such that the servo read head 26 can read a servo pattern recorded in the servo track 27 occurs when the tape 20 is moved linearly with respect to the servo read head 26 along the length of the servo track 27. When such movement occurs, a servo pattern including magnetic flux transitions recorded in the servo track 27 is detected by the servo read head 26 so that it generates an analog servo read head signal that is provided via a servo signal line to read and decoder circuitry 24. The read and decoder circuitry 24 processes the servo read head signal and generates a position error signal that is provided to processing unit 26, e.g., a servo controller. The servo controller or processing unit 26 generates a servo positioning actuation command or control signal, and provides such a signal, such as via a conditioning circuit 32, to the positioning actuator 34. The positioning actuator 34, e.g., a servo mechanism, responds to the control signal from the processing unit 26 by moving the servo head 26 laterally across the width 29 of the servo track 27 in the translating direction. The processing unit 26, e.g., the servo controller, monitors the position signal from the read and decoder circuitry 24 and generates the control signals, i.e., actuation commands, necessary to reach the desired position for the servo head. Through positioning of the servo read head 26, the data read/write heads 14 are likewise desirably moved.

Figure 3A:
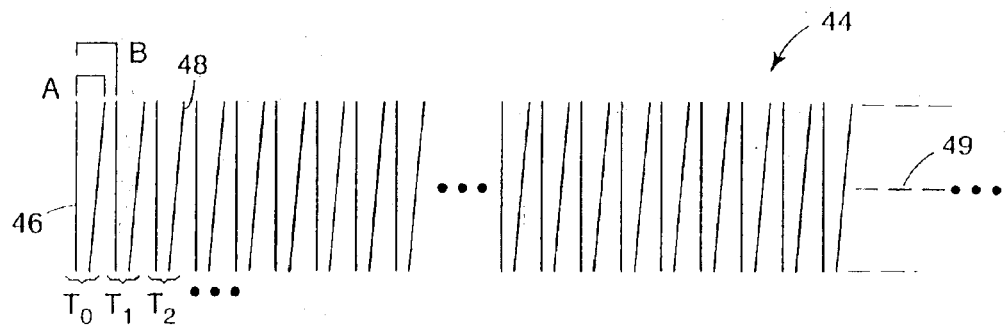
FIGS. 3A–3C are representations of three alternate servo patterns known in the prior art.
Figure 3B:
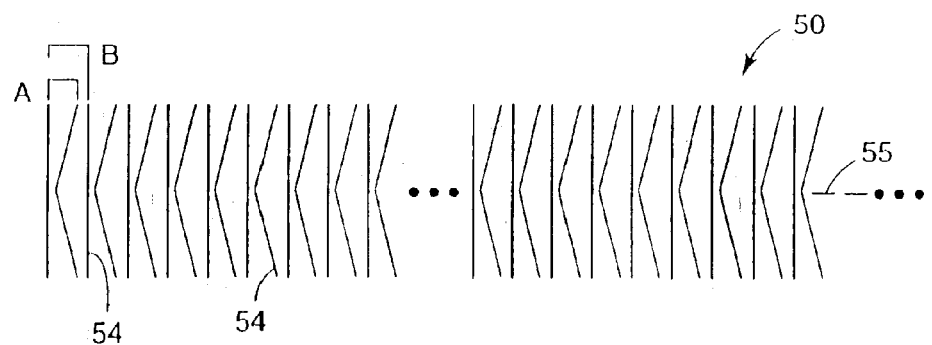
Figure 3C:
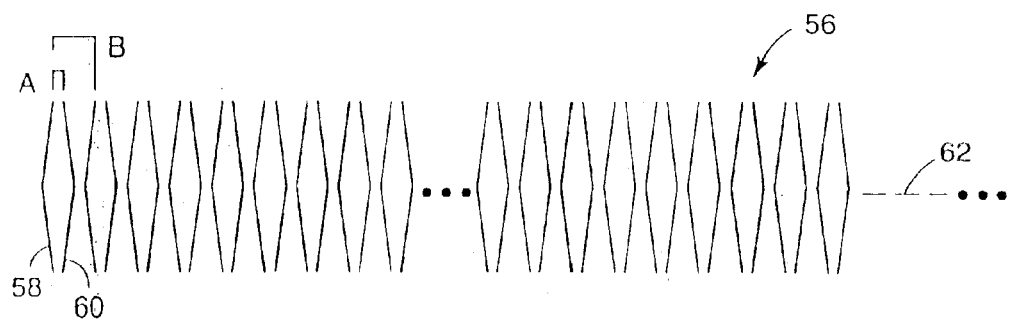

FIGS. 3A–3C show prior art servo patterns recorded in servo tracks for time based servo systems. The servo patterns include magnetic flux transitions that extend across the width of the servo track such that a servo read head signal produced by reading the pattern varies continuously as the servo read head is moved across the width of each servo track. Such servo patterns are described in U.S. Pat. No. 5,689,384 to Albrecht et al., entitled "Timing Based Servo System For Magnetic Tape Systems," issued 18 Nov. 1997.

FIGS. 3A–3C show alternate embodiments of prior art servo patterns which include dark vertical bands, i.e., stripes, representative of magnetized areas of recorded magnetic flux that extend across the width of a servo track. The edges of the stripes comprise flux transitions that are detected to generate the servo read head signal as the tape is moved across a servo read head. The transitions have two magnetic polarities, one on each edge of the stripe. When the servo read head crosses a transition, it produces a pulse whose polarity is determined by the polarity of the transition. For example, a servo read head might produce positive pulses on the leading edge of each stripe (on encountering the stripe) and negative pulses on the trailing edge (on leaving the stripe).

Each servo pattern shown in FIGS. 3A–3C includes a repeating sequence of different stripes having at least two orientations across the width of the track such that the first orientation is not parallel to the second orientation. For example, as shown in FIG. 3A, the servo pattern 44 comprises an alternating sequence of first stripes 46 that extend across the width of the track substantially perpendicular to the transducing direction of the track and the second stripes 48 that have an azimuthal slope with respect to the servo read head. That is, the second stripes are at a slope relative to the lengthwise track center line 49. The servo pattern 50, illustrated in FIG. 3B, includes an alternating sequence of straight first stripes 52 that are oriented perpendicular to the track center line and chevron-shaped second stripes 54 having two legs each with an azimuthal slope symmetrically from the other about the track center line 55. That is, the pattern 50 is characterized as being formed from two tracks that are reflections of each other, each track including one leg 54a or the other 54b of the chevrons. The pattern 56 shown in FIG. 3C comprises a chevron-shaped first 58 and second 60 stripes that are placed back-to-back so as to form a diamond-shaped pattern that is symmetric about the track center line 62.

With each one of the servo patterns 44, 50 and 56 illustrated in FIGS. 3A–3C, a magnetic servo read head that is positioned above the tape 20 as the tape is moved linearly with respect to the head in the transducing direction generates an analog servo read head signal having peaks whose peak-to-peak timing varies if the head is moved across the width of the track in a translating direction. The variation in timing is used to determine the relative position of the magnetic servo read head within the servo track.

The servo patterns 44, 50, 56 include first and second stripes that define first and second intervals referred to in U.S. Pat. No. 5,689,384 as A intervals and B intervals that are used to generate a position signal. The position signal is generated by timing the intervals and calculating their ratio. For these patterns, an A interval is defined as the interval along the tape transducing direction from a stripe of one type to the next stripe of the other type, while a B interval is defined as the interval along the tape transducing direction between two stripes of the same type.

As described in U.S. Pat. No. 5,689,384, the servo patterns are written using a pattern recording system wherein magnetic tape is passed by a servo write head. The servo write head is periodically energized with a current pulse of predetermined polarity at predetermined times. That is, the head is switched between a zero current and a current of a single polarity. To produce the patterns shown in FIGS. 3A–3C, a two gap servo write head is used. The two gaps are configured to result in the desired servo pattern. For example, for the servo pattern in FIG. 3A, the two gaps would be write gaps configured similar to stripe 46 and stripe 48. Therefore, as the tape is moved across the two write gaps of the servo write head, the servo write head is periodically energized to record a first pair of vertical and slanted lines 46, 48 at time t0, a second set at time t1, a third set at time t2, a fourth set at time t3, and so on.

The writing of two stripe patterns, such as those shown in FIGS. 3A–3C, in this manner are susceptible to errors due to tape speed variations at the time the servo pattern is recorded. For example, the position error signal (PES) for the control system may be calculated by measuring the ratio of the time intervals (A/B) as described above. For example, this ratio may be compared to an ideal desired value stored in a track table, and an error measure may be derived from the difference. If during recording of the servo pattern in the servo track the tape changed speed between the time $t_0$ and $t_1$, the time interval used as a reference, i.e., time interval B determined as the servo read head is moved between like stripes, would be in error by an amount proportional to this recording speed change. As this time interval B is used to normalize the timing interval A determined as the servo read head is moved between stripes of different orientation, to generate a position signal, the error in the recording speed (e.g., the change in speed between time $t_0$ and $t_1$) due to tape speed change is undesirably transferred nearly directly to the position signal and thus to the PES generated for control of a servo mechanism. In addition to undesirable errors in the PES, typically conventional drive systems report a measured reference interval, e.g., interval B, to determine and/or report playback speed, and as such the error in time interval B, i.e., the reference time interval, is also transferred to this playback speed determination.

Figure 4A:
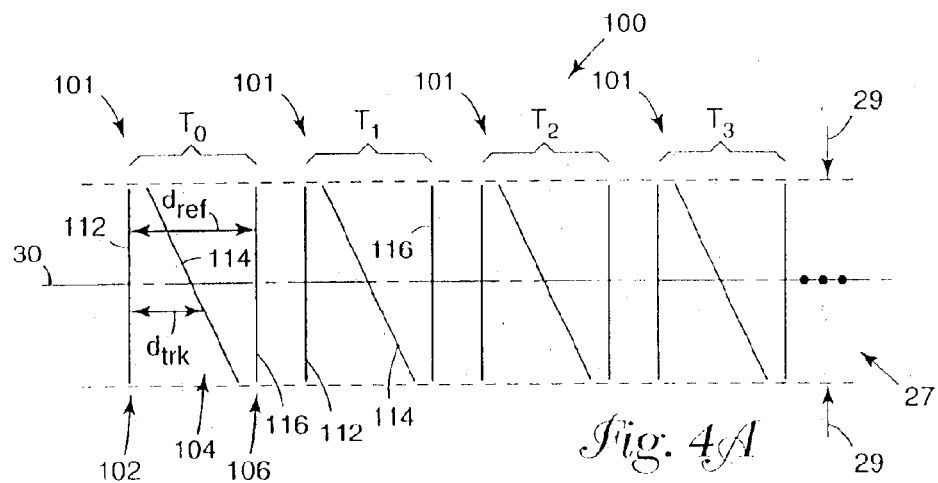
FIGS. 4A–4C are representations of three alternate servo patterns according to the present invention.

According to the present invention, as will be described further below, a repeated servo pattern recorded along the length of a servo track is performed by recording three pattern lines, as opposed to two stripes as described above with reference to FIGS. 3A–3C. Two of the three pattern lines of altered magnetic state recorded according to the present invention have identical predetermined geometries, e.g., vertical pattern lines 112, 116 such as shown in FIG. 4A, whereas the remaining pattern line, e.g., a sloped patterned line 114 having a slope with respect to center line 30 of servo track 27 such as shown in FIG. 4A, has a predetermined geometry that is different from the two pattern lines having identical geometry. As such, the pattern lines which are available for use in providing a reference time interval ($t_{ref}$), so as to normalize the position track time interval ($t_{trk}$) as described further below during a servo sample time period, are recorded simultaneously. This removes the sensitivity to tape velocity at the time of recording the servo patterns as described above.

It is highly desirable to write both the pattern lines used for determination of the reference time interval ($t_{ref}$) and the tracking time interval ($t_{trk}$) at the same instant. In other words, a servo pattern which is repeated according to the present invention includes three pattern lines of altered magnetic state per servo writing cycle, e.g., each energization of a write head having three write gaps configured similarly to the desired three pattern lines, versus two stripes recorded as described above with reference to FIGS. 3A–3C. This ensures that recording speed during the recording of the servo pattern in the servo track 27 is not a primary cause of error when the servo pattern in the servo track is being read by a servo read head and associated circuitry.

Figure 4B:
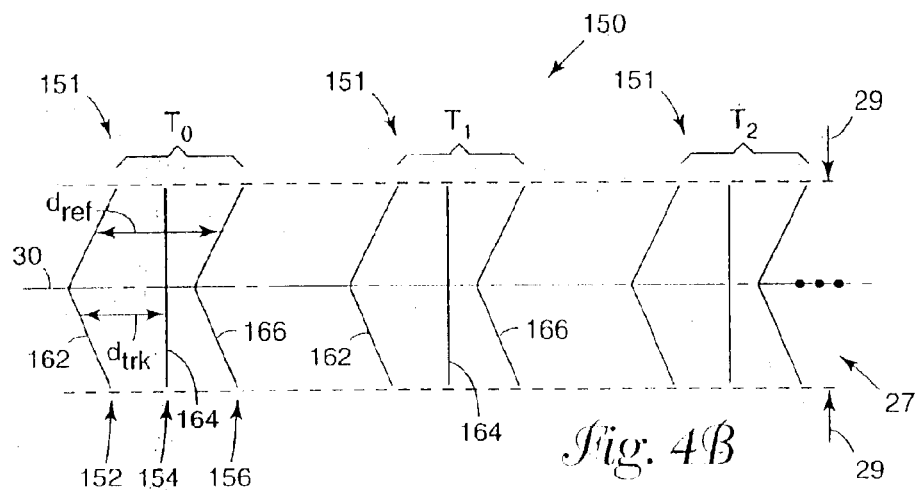
Figure 4C:
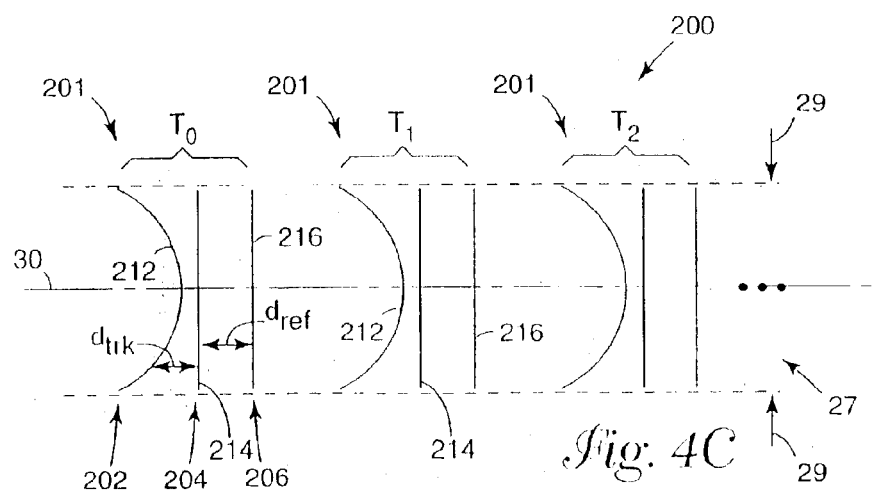

FIGS. 4A–4C show alternate embodiments of servo patterns 100, 150, 200 repeatedly recorded along the length of servo track 27 according to the present invention. It will be recognized by one skilled in the art from the description herein, that the servo pattern need not be recorded continuously in a servo track along the length of a tape, and further, the servo track need not extend along the entire length of the tape. For example, the servo system may employ servo track sectors located at various positions along the length of the tape, e.g., servo track sectors at the beginning and/or end of the tape, or servo track sectors periodically located along the length of the tape. In other words, for example, the servo pattern may be recorded in a servo track extending along only a portion of the length of a tape, e.g., the servo pattern may be periodically recorded in periodic servo track sectors located along portions of the length of the tape. Further, the servo patterns described and used herein may be recorded and used with medias other than tape storage media, e.g., disc media.

Each servo pattern repeated along the length of the servo track 27 in FIGS. 4A–4C includes three pattern lines, e.g., pattern lines 112, 114, 116 in FIG. 4A. The servo track 27 has a width 29 measured orthogonal to a center line 30 extending along the length of the servo track 27 and positioned preferably equidistant from the edges 31 of the servo track. Each of these three pattern lines is preferably simultaneously recorded in the servo track 27 to eliminate sensitivity to recording speed as described above. Each of the pattern lines of the repeated servo patterns is a line of altered magnetic state of the servo track 27. Each pattern line represents magnetized areas of recorded magnetic flux that extend across the width 29 of the servo track 27. The edges of the pattern lines comprise flux transitions that can be detected by servo read head 26 to generate servo read head signals. The transitions have two magnetic polarities, one on each edge of the pattern line.

As previously described herein with reference to FIGS. 3A–3C, when a servo read head crosses a transition of a pattern line, it produces a pulse whose polarity is determined by the polarity of the transition. For example, the servo read head might produce positive pulses on the leading edge of each pattern line (on encountering a pattern line) and negative pulses on the trailing edge (on leaving a pattern line). Each servo pattern repeated along the length of servo track 27 has two servo reference pattern lines of identical geometry extending across the width 29 of the servo track 27 and one servo track pattern line which has a geometry different than the two servo reference pattern lines that have identical geometry.

Repeated servo pattern 100, as shown in FIG. 4A according to the present invention, includes a servo pattern 101 repeated along the length of servo track 27. Each servo pattern 101 is recorded along the servo track 27 at a distinct time period. For example, a servo pattern 101 is written at time $t_0$, at time $t_1$, at time $t_2$, at time $t_3$, and so on.

Each servo pattern 101 includes three pattern lines. The three pattern lines include two servo reference pattern lines 112, 116 recorded in a first and second servo pattern reference region 102, 106, respectively. Further, each servo pattern 101 includes a servo track pattern line 114 recorded in a servo pattern track region 104. Each of the reference pattern lines 112, 116 extend across the width 29 of the servo track 27 substantially perpendicular to the transducing direction, or, in other words, orthogonal to center line 30 of the servo track 27. As shown in FIG. 4A, the reference pattern lines 112, 116 are straight pattern lines.

Track pattern line 114 recorded in servo pattern track region 104 is a linear pattern line positioned at an angle, i.e., sloped, relative to center line 30. Track pattern line 114 is therefore also at an angle relative to reference pattern lines 112, 116. Track pattern line 114 also extends across the width 29 of servo track 27.

Repeated servo pattern 150, as shown in FIG. 4B, includes servo patterns 151 recorded along the length of servo track 27. Each servo pattern 151 repeated along the length of servo track 27 includes two reference pattern lines 162, 166 recorded in servo pattern reference regions 152, 156, respectively. Further, each servo pattern 151 includes a servo track pattern line 164 recorded in servo pattern track region 154. Each of the reference pattern lines 162, 166 are chevron-shaped pattern lines having two legs with each leg having a slope relative to the centerline 30 and symmetric relative to one another about the center line 30. Further, each of the reference pattern lines 162, 166 extend across the width 29 of the servo track 27. The track pattern line 164 of each servo pattern 151 is a straight pattern line extending across the width 29 of servo track 27 orthogonal to center line 30 of the servo track 27. The servo pattern 151 is repeated along servo track 27 at times $t_0$, $t_1$, $t_2$, and so on.

Another repeated servo pattern 200 is shown in FIG. 4C. The repeated servo pattern 200 includes a servo pattern 201 repeatedly recorded along servo track 27 at times $t_0$, $t_1$, $t_2$, and so on. Each servo pattern 201 includes two reference pattern lines 214, 216 recorded in respective servo pattern reference regions 204, 206. Further, each servo pattern 201 includes track pattern line 212 extending across the width 29 of the servo track 27. The reference pattern lines 214, 216 are generally orthogonal to the center line 30 of the servo track 27 and extend across the width 29 thereof. Track pattern line 212 is a curved line, e.g., an arc, an elliptical segment, a segment of a circle, etc. The curved track pattern line 212 also extends across the width 29 of the servo track 27.

Each servo pattern 101, 151, 201 repeated in the servo tracks 27 illustrated in FIGS. 4A–4C includes first and second reference pattern lines that define a reference distance ($d_{ref}$), e.g., reference pattern lines 112, 116 of FIG. 4A, which is constant across the width 29 of the servo track 27 as such reference pattern lines are recorded in the servo track 27 simultaneously. Further, the repeated servo patterns 101, 151, 201 each include a track pattern line, e.g., track pattern line 114, which in conjunction with one of the reference pattern lines defines a tracking distance ($d_{trk}$) which varies across the width 29 of the servo track 27.

As illustrated by FIG. 4B, one will recognize that the reference pattern lines need not be straight pattern lines or orthogonal pattern lines extending across the width 29 of the servo track 27. It is only required that such servo reference pattern lines be of identical geometries, e.g., straight reference pattern lines in FIGS. 4A and 4C and chevron reference pattern lines in FIG. 4B. Further, one will recognize that the servo track pattern lines need not be sloped patterned lines extending across the width 29 of the servo track as shown in FIG. 4A. It is only required that such servo track pattern lines be of a geometry different than the servo reference pattern lines, e.g., a sloped track pattern line of FIG. 4A, a straight track pattern line as shown in FIG. 4B, and a curved pattern line as shown in FIG. 4C.

As such, one skilled in the art will recognize from the description herein that no particular geometry for the servo reference pattern lines or servo track pattern lines is required, although some geometries may be advantageous over others. For example, preferably, the reference pattern lines are straight pattern lines orthogonal to center line 30 transverse to tape velocity as the servo track 27 is being read. As such, the orthogonal straight reference pattern lines are generally insensitive to transverse tracking motion because of the orthogonal nature of the reference tracks relative to center line 30. Further, preferably, the servo track pattern line is a continuous single sloped pattern line as shown in FIG. 4A as opposed to a line such as a curved track pattern line 212 shown in FIG. 4C. By having one continuous sloping pattern line 114 instead of a line with a curve or more than one slope, absolute track position is unambiguous, e.g., the ambiguity around the center of the pattern is removed.

Therefore, it will be recognized by one skilled in the art from the description herein that any repeated servo pattern of three pattern lines wherein two of the pattern lines have identical predetermined geometries with the other of the three pattern lines having a different geometry than the two identical pattern lines may be used according to the present invention. According to the present invention, the track reference lines are preferably simultaneously recorded on the servo track 27 and likewise, preferably, the servo track pattern line is simultaneously recorded with the servo reference track lines.

As shown in FIG. 4C, the reference pattern lines 214, 216 are adjacent one another as opposed to having a track reference line therebetween. Generally, FIG. 4C illustrates that the servo patterns as described herein may include three pattern lines wherein the reference pattern lines may be adjacent to one another. In other words, the three pattern lines repeatedly recorded in the servo track 27 may be of any order. For example, the reference pattern lines may be adjacent one another on either side of the track pattern line, e.g., the pattern lines shown in FIG. 4C; the track pattern line may separate the two reference pattern lines, e.g., the pattern lines shown in FIGS. 4A and 4B; etc.

Figure 5:
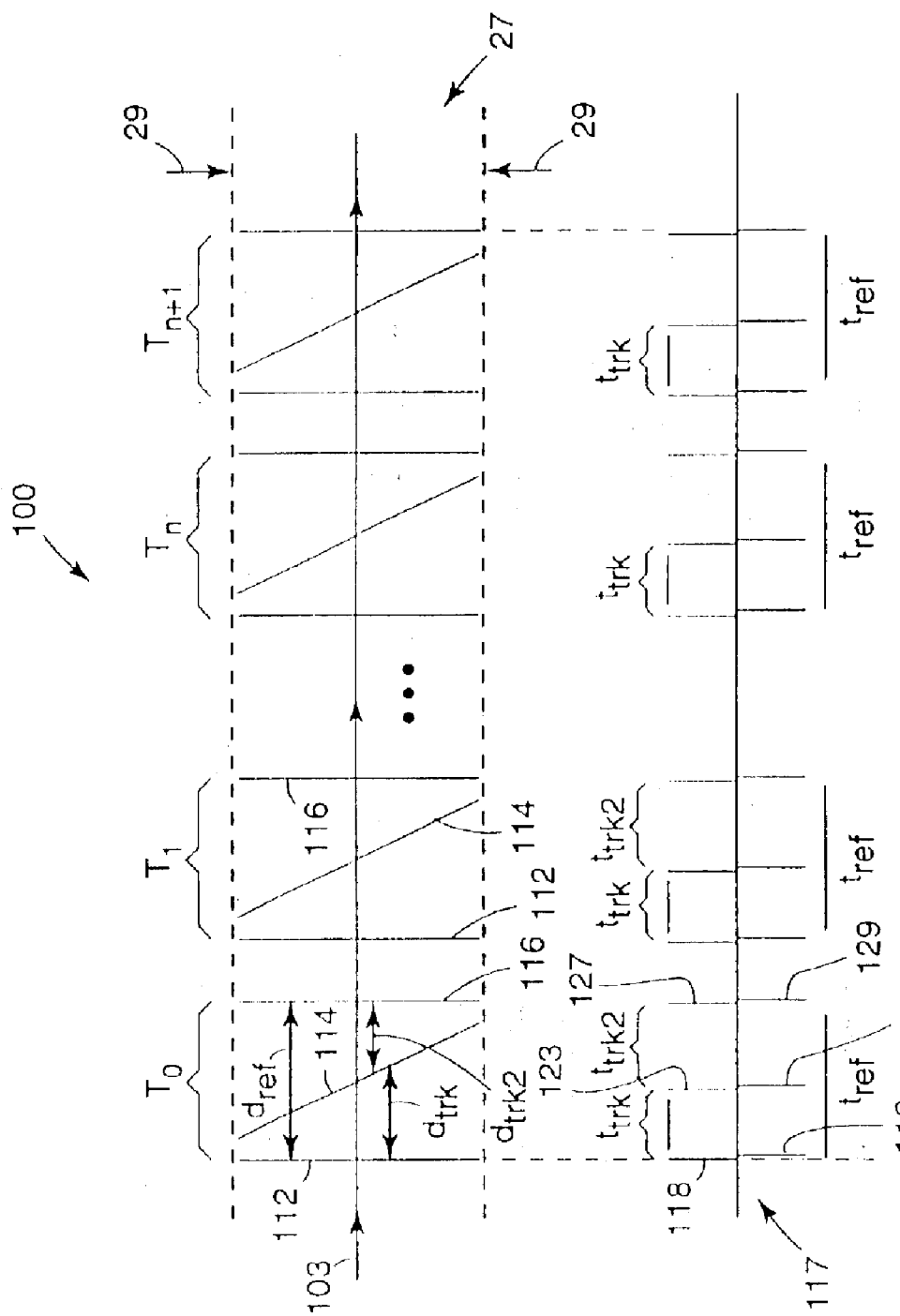
FIG. 5 is an illustration of the servo information signal generated by the magnetic head illustrated in FIG. 2 when a tape, including a servo pattern like that of FIG. 4A, is moved in a transducing direction across the magnetic head.

Generation of a position signal indicating the position of a servo read head in the servo track 27 is performed in substantially the same manner using any of the repeated servo patterns 100, 150, 200. As such, for simplicity, generation of the position signal shall be limited to description with reference to servo pattern 100 as shown in FIG. 5. FIG. 5 illustrates the repeated servo pattern 100 as shown in FIG. 4A showing a path 103 followed by servo read head 26 as the tape 20 is moved in a transducing direction across the servo read head 26. Below the repeated servo pattern 100 in servo track 27 is a corresponding servo read head signal 117 generated by the magnetic servo read head 26 as it crosses the pattern lines 112, 114, 116 recorded in servo track 27. For example, as servo read head 26 crosses pattern line 112, transition signals 118, 119 are generated. As servo read head 26 crosses the track pattern line 114, transition signals 123, 125 are generated, and, likewise, as the servo read head 26 crosses reference pattern line 116, transition signals 127, 129 are generated. Using such signals, e.g., such as the positive edge signals 118, 123, 127, time intervals $t_{ref}$ and $t_{trk}$ are generated as shown in FIG. 5.

Such timing intervals are used to determine the relative position of the servo read head 26 within the servo track 27. The variation in the tracking time interval ($t_{trk}$) as the read head is moved in a translating direction across the width 29 of the servo track 27 is normalized by the reference time interval ($t_{ref}$). In other words, the time intervals $t_{ref}$ and $t_{trk}$ are used to generate a position signal by generating the timing of the intervals using the servo read head 26 and calculating the ratio ($t_{trk}/t_{ref}$) of the intervals.

For each of the servo patterns, the $t_{ref}$ interval is defined as the time it takes for the servo read head to travel the reference distance ($d_{ref}$) along the tape transducing direction between two simultaneously recorded reference pattern lines having identical geometries, and the $t_{trk}$ interval is defined as the time it takes for the servo read head to travel a tracking distance ($d_{trk}$) between a track pattern line and a reference pattern line. It will be noted that, assuming constant servo read head speed, that only the $t_{trk}$ interval varies as the servo read head moves across the width of the servo track 27. Assuming constant speed of the servo read head, the $t_{ref}$ interval, due to the simultaneous recording of the reference pattern lines, i.e., a constant reference distance ($d_{ref}$), will remain generally constant across the width of the servo track 27.

As such, as the servo read head is moving in a transducing direction, a position error signal (PES) for the servo control system may be calculated by using the generation of the ratio of the time intervals ($t_{trk}/t_{ref}$). For example, as described above with reference to FIGS. 3A–3C, this ratio may be compared to an ideal desired value stored in a track table, and an error measure may be derived from the comparison by processing unit 26. Therefore, the ratio of such time intervals is used to reposition the servo read head 26 in servo track 27, such as by the positioning actuator 34, to achieve a particular target destination.

One skilled in the art will recognize from the description herein that a tracking time interval may also be generating corresponding to the tracking distance ($d_{trk2}$) shown in FIG. 5. This time interval may be used with the tracking time interval ($t_{trk2}$) corresponding to the tracking distance ($d_{trk}$) to provide a more accurate position signal. For example, the ratio ($t_{ref}-t_{trk2}/t_{ref}$) may be averaged with the ratio ($t_{trk}/t_{ref}$) to determine a position signal.

Figure 6A:
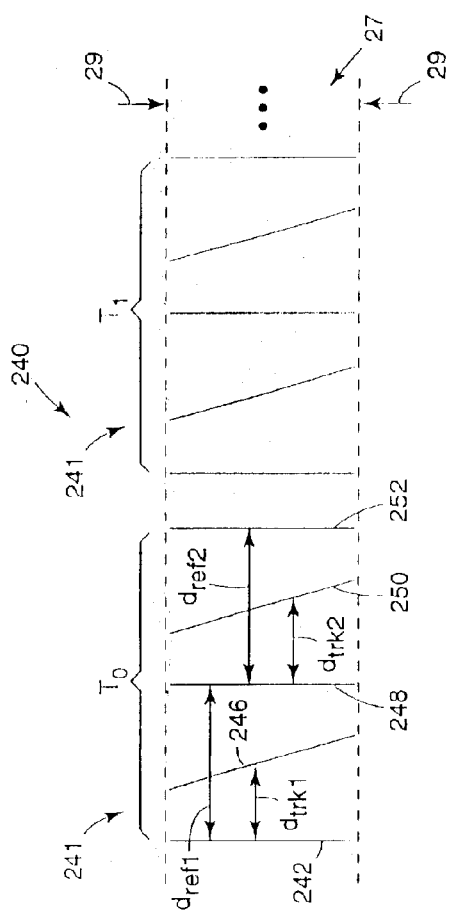
FIGS. 6A and 6B are alternate configurations of servo patterns according to the present invention.
Figure 6B:
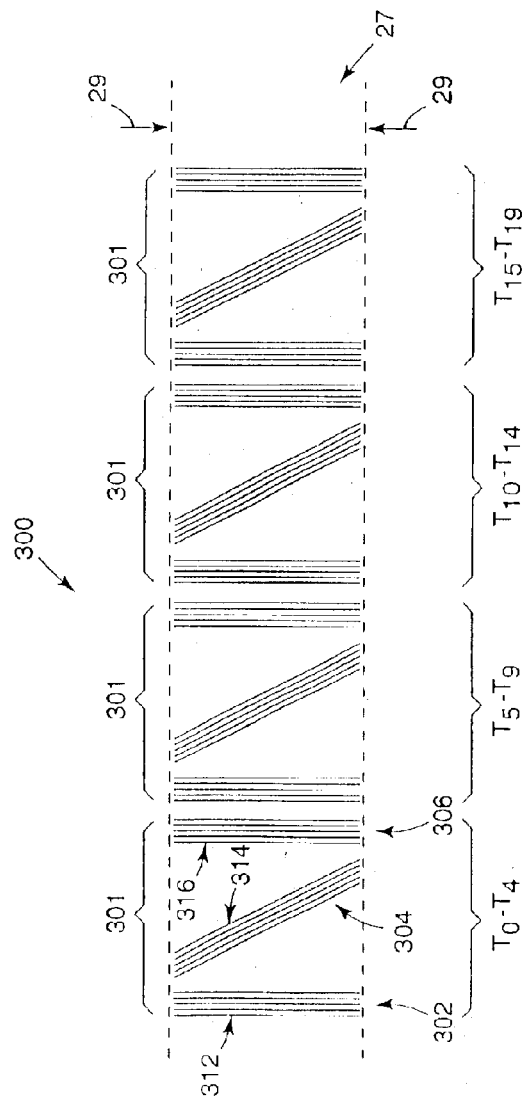

FIGS. 6A and 6B are alternate illustrative repeated servo patterns according to the present invention. Generally, repeated servo pattern 240 includes servo pattern 241 recorded along servo track 27 at times $t_0$, $t_1$, and so on. Each of the servo patterns 241 include five pattern lines recorded simultaneously. Such pattern lines include reference pattern lines 242, 248, and 252. Further, such pattern lines include track pattern lines 246, 250. As shown in FIG. 6A, each simultaneously recorded servo pattern 241 would provide at least two reference time intervals ($t_{ref}$) and two track time intervals ($t_{trk}$) corresponding to the reference distances ($d_{ref1}$, $d_{ref2}$) and tracking distances ($d_{trk1}$, $d_{trk2}$), respectively, to determine the position of a read head in the servo track 27 as a servo read head moves in the transducing direction. For example, the ratios of $t_{trk1}/t_{ref1}$ and $t_{trk2}/t_{ref2}$ may be averaged to provide a position signal.

Although the simultaneous recording of more than three pattern lines according to the present invention may be used to provide additional servo read head signals for providing time based servo according to the present invention, preferably each servo pattern includes only three pattern lines simultaneously recorded. With the use of three pattern lines as described previously with reference to FIGS. 4A–4C, such pattern lines can be kept consistent with less tolerances between pattern line dimensions. This provides a more consistent servo read signal. Further, recording more than three pattern lines in the servo track 27 requires a more complex servo write head with more write gaps, and also a longer head to tape contact length, leading to further tolerance problems.

Repeated servo pattern 300 of FIG. 6B includes servo pattern 301 recorded along servo track 27. Servo track 301 includes sets of multiple reference pattern lines 312, 316 recorded in servo pattern reference regions 302, 306, respectively. Further, servo pattern 301 includes a set of track pattern lines 314 recorded in the servo pattern track region 304. As readily recognized, the reference pattern lines and track pattern lines are substantially similar to those recorded in the repeated servo pattern 100, as shown and described with reference to FIG. 4A. However, to record the sets of pattern lines, one pattern line of each set 312, 314, and 316 are written simultaneously at a particular time such as to, with other lines of the sets written at different times. As such, and as shown in FIG. 6B, the sets of reference pattern lines 312, 316 and set of track pattern lines 314 require five simultaneous writes at times $t_0$–$t_4$ as each set 312, 314, 316 includes five pattern lines. Further, the additional servo patterns 301 shown in FIG. 6B are written during times $t_5$–$t_9$, $t_{10}$–$t_{14}$, $t_{15}$–$t_{19}$, and so on.

Using sets of pattern lines as opposed to single pattern lines provides for improved accuracy in determining the position of the servo read head 26. For example, multiple subsample measurements within the servo pattern 301 may be performed during a tracking sample, i.e., a sample used to determine a position of the servo read head 26. Such use of multiple pattern lines as opposed to single pattern lines is described in U.S. Pat. No. 5,689,384 for error correction, improved signal generation, etc. For the sake of simplicity, a further description of the use of sets of multiple pattern lines in place of a single pattern line shall not be provided. One skilled in the art will recognize that any of the servo patterns as described herein may be implemented using sets of pattern lines instead of single pattern lines and that the present invention is not limited to the particular illustrative single servo pattern illustrations provided herein.

Figure 7:
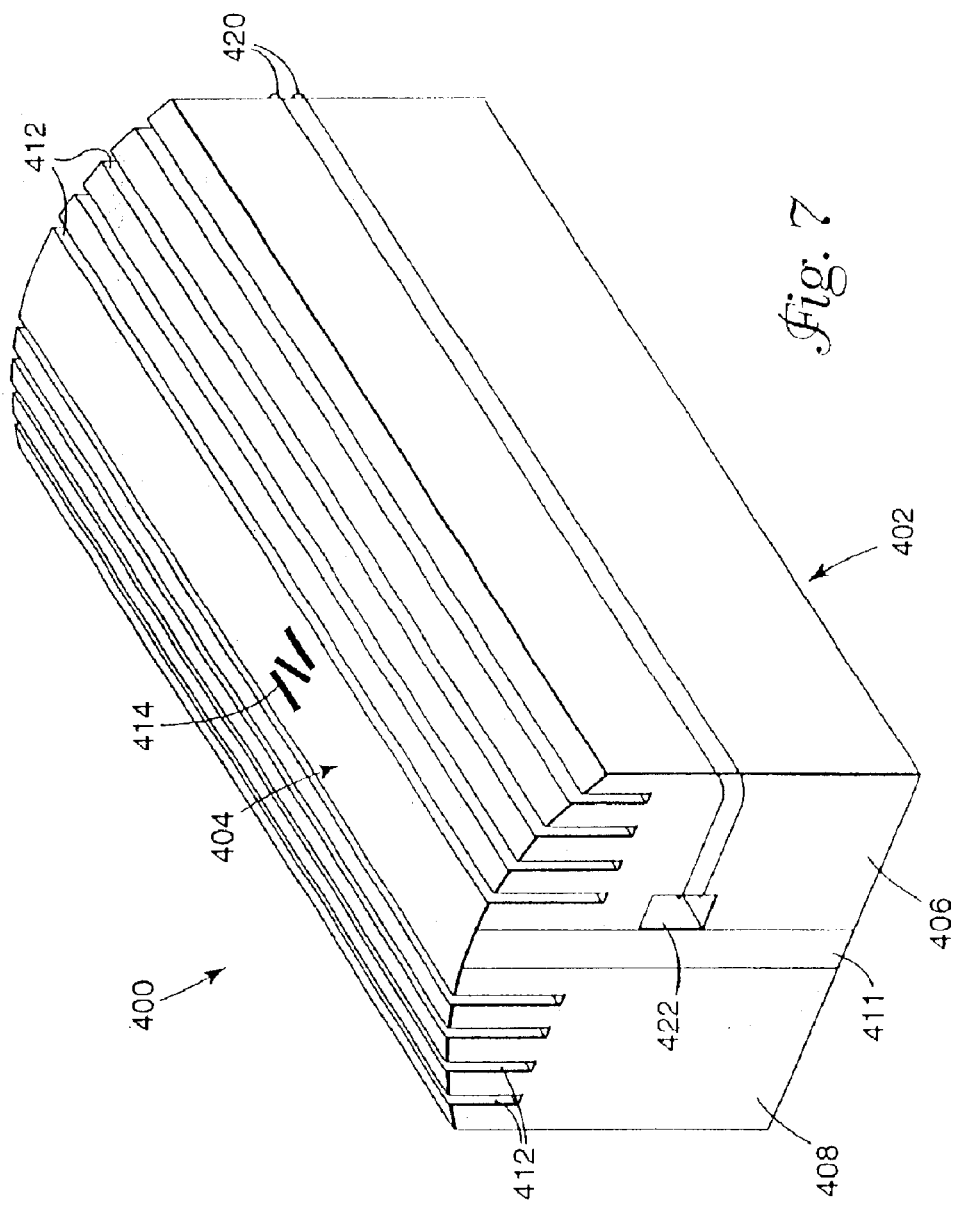
FIG. 7 is a representation of a three write gap head that may be used to record the servo pattern illustrated in FIG. 4A.
Figure 8:
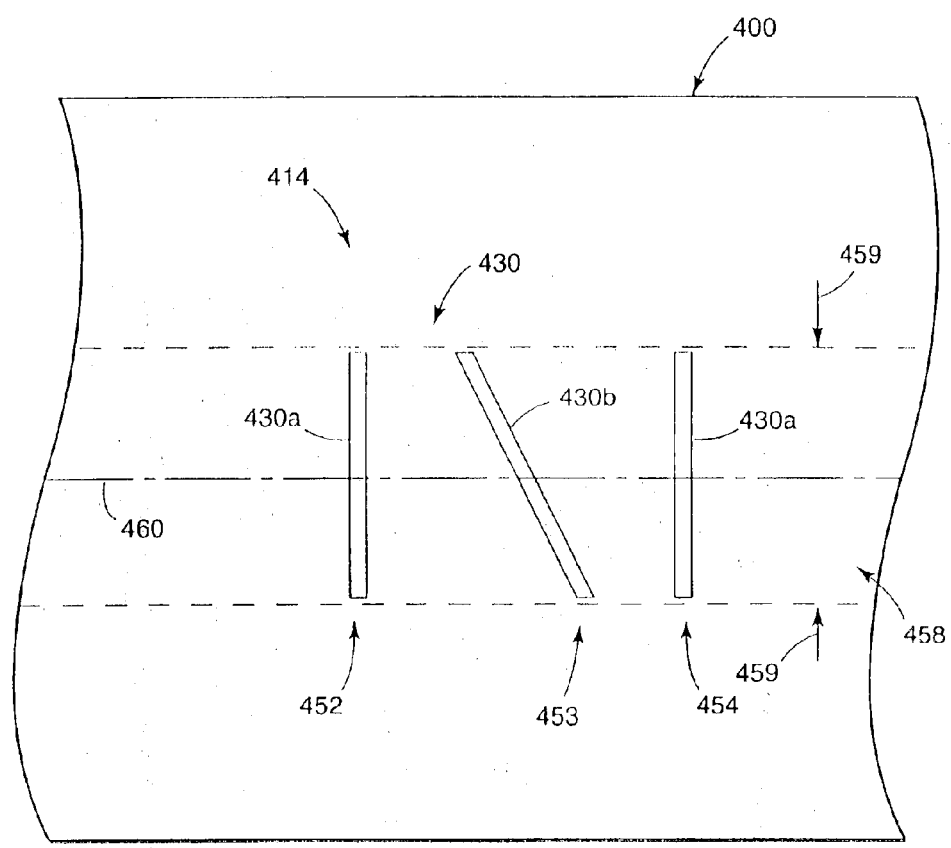
FIG. 8 is a top view of the servo pattern write gap region of the head shown in FIG. 7.
Figure 9:
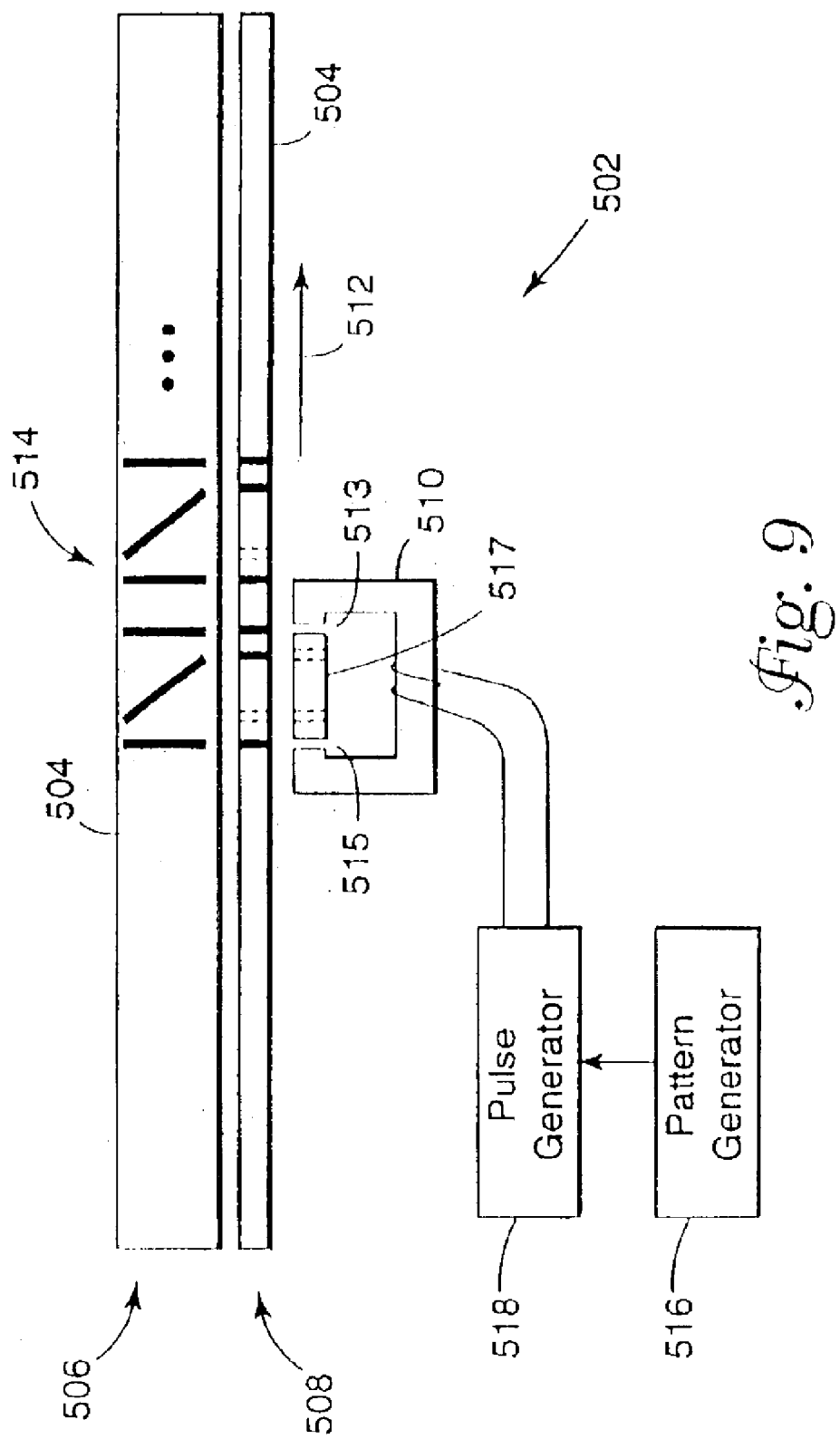
FIG. 9 is a schematic representation of a servo recording system for recording a servo pattern on a magnetic tape according to the present invention.

Those skilled in the art will appreciate that a variety of techniques can be used to record the servo patterns in servo tracks according to the present invention as described herein. FIGS. 7–9 are provided to illustrate one embodiment of a servo write head and system for recording such servo patterns.

A preferred method for producing the patterns is with a multiple write gap servo write head such as the servo write head 400 shown in FIG. 7. Generally, the servo write head 400 is substantially the same as that described in U.S. Pat. No. 5,689,384 with the exception that instead of two write gaps, the servo write head 400 includes three write gaps in the write gap structure 414. For example, the servo write head 400 may comprise a ferrite ring 402 with a patterned NiFe pole piece region 404. Two ferrite blocks 406, 408 form the bulk of the magnetic head and are separated by a glass spacer 411. Cross-slots 412 are cut into the head to remove included air when the head 400 is in operation with magnetic tape. The desired configuration for the write gap structure 414 is dictated by the desired servo pattern configuration, such as those servo patterns 101, 151, 201 as described herein according to the present invention. The write gap structure 414 is provided on the pole piece region 404. Further, a coil 420 is wound around one of the ferrite blocks 406 through a wiring slot 422 to complete the servo write head 400.

FIG. 8 shows the write gap structure 414 in further detail. The write gap structure 414 may be contained within a continuous sheet of magnetic NiFe. As shown in FIG. 8, generally the write gap structure 414 includes three write gaps 430 corresponding to the desired pattern being written. As previously described herein, the desired servo pattern being written includes two reference pattern lines having identical geometries, and, therefore, two of the right gaps 430a are of identical geometry. Likewise, as the desired servo pattern described herein includes a pattern line having a geometry which is different than the other two identical pattern lines, one of the write gaps 430 must be different, as shown by the angled write gap 430b in FIG. 8. Each of the write gaps 430 are provided in respective write head regions 452, 453, and 454. Each of the write gaps 430 is symmetrical about center line 460 which extends across a region 458 of the servo write head 400 which has a width 459 generally corresponding to the width 29 of servo track 27.

FIG. 9 illustrates the process of producing a magnetic tape having a servo pattern illustrated above using a pattern recording system 502. The system 502 can be provided, for example, in a tape drive. In particular, FIG. 9 illustrates the process of producing a magnetic tape having a servo pattern as shown in FIG. 4A and shows a magnetic tape 504 in a top view 506 and a side view 508 as it is passed in contact with a write head 510. The tape is moved in the direction indicated by the arrow 512.

The tape write head 510 ordinarily is not energized but is selectively energized, e.g., periodically energized, with a current pulse of predetermined polarity at predetermined times. That is, the head may be switched between a zero current and a current of a single polarity.

To produce the desired servo pattern on the tape 504, the tape is moved at a predetermined velocity while the write head 510 is intermittently pulsed with the current. Intermittent current pulses of the write head 510 produce flux patterns on the tape 504 that are a copy of the head gap structure, as illustrated by the representation of the tape pattern 514 in FIG. 9. Write gaps are illustrated by gaps 513, 515, and 517. A programmable pattern generator 516 of the servo pattern recording system 502 generates pulses that are provided to pulse generator 518 that causes the desired intermittent energizing of the write head 510. Because the pulse width is finite and the tape is moving at a predetermined velocity, the servo flux patterns recorded onto the tape 504 are elongated versions of the actual gaps 513, 515, 517 of the write head 510.

As shown by this illustrative recording process, reference pattern lines are recorded simultaneously with a track pattern line providing for a consistent servo pattern along the servo track. Such consistency provides for improved accuracy in the servo control system.

Figure 10:
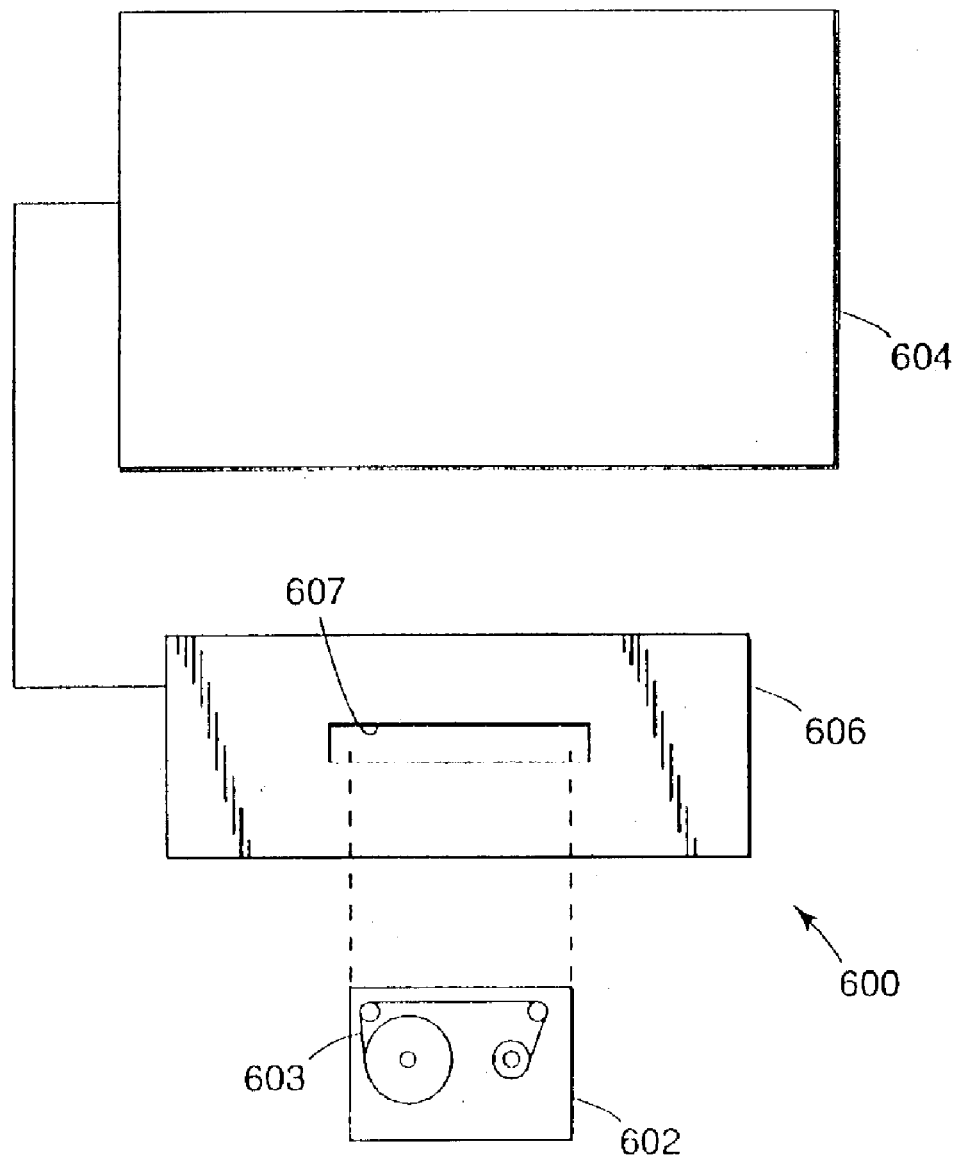
FIG. 10 is an illustrative diagram of a servo recording system for recording time-based servo on tape contained in a data cartridge.

Because of the nature of the servo patterns recorded according to the present invention, the accuracy of reading the servo pattern recorded in the servo track of a tape is less dependant on the accuracy of the tape velocity during the recordation of the servo pattern on the tape. As such, servo recording equipment with tape velocity control may not be needed to record servo tracks according to the present invention. Therefore, use of servo patterns as described according to the present invention make it possible to record servo patterns on tape of a tape cartridge using a conventional drive apparatus modified with an appropriate servo write head and associated circuitry as shown in FIG. 10. Generally, in the past, such servo pattern writing required the use of special equipment including suitable tape speed variation control mechanisms and/or techniques with the servo recording being performed prior to the tape cartridge fabrication, e.g., servo recording in the factory.

FIG. 10 illustrates a servo writer system 600 for writing servo patterns according to the present invention on tape 603 contained in a tape cartridge 602. The servo writer system 600 includes a tape drive 606 that accepts a tape cartridge 602 and which is connected to a host processor 604. The tape cartridge 602 generally includes a housing containing a loop of magnetic tape 603. The system 600 is constructed for use in writing servo patterns according to the present invention on the tape 603.

The tape drive 606 includes a receiving slot 607 into which the tape cartridge 602 is inserted. The host processor 604 may be, for example, a personal computer, a workstation, a mini-computer, or any other suitable computing unit. The tape drive 606 is preferably compatible with the host processor 604 and, for example, tape systems that employ tape cartridges. For example, the tape drive 606 may be an IBM 3480 or 3490 tape drive unit modified to perform writing of servo patterns according to the present invention.

Such a tape drive 606 would include a servo read head such as those described herein and also circuitry for controlling the writing of the servo patterns on the tape 603 contained in the tape cartridge 602 in the tape drive 606. Such modifications would be readily apparent to those skilled in the art without further explanation. For example, the modifications would be similar to the inclusion of apparatus described with reference to FIGS. 7–9.

With the ability to use a tape drive to write time-based servo patterns as described herein, as opposed to the use of specialized equipment, such servo pattern recording may be performed in the field as opposed to at the factory prior to fabrication of the tape cartridge. This further allows the erasure of the tape cartridge in the field followed by recording of the servo patterns thereafter. As such, for example, a tape cartridge user would be able to bulk erase and reuse tape cartridges having time-based servo information recorded thereon.

All patents and references disclosed herein are incorporated by reference in their entirety, as if individually incorporated. The preceding specific embodiments are illustrative of the practice of the present invention. It is to be understood, therefore, that other expedients known to those skilled in the art or disclosed herein may be employed without departing from the invention or the scope of the appended claims. For example, the present invention is not limited to the particular illustrative configurations of servo patterns shown herein. For example, any technique using the simultaneous recording of reference pattern lines with a track pattern line is intended to be within the scope of the present invention. Further, the present invention includes within its scope various methods associated with the servo patterns according to the present invention.

What is claimed is:

1. A system for recording servo track information within a servo track extending along at least a portion of the length of a tape, wherein the servo track has a track width orthogonal to the length of the tape, the system comprising:

a servo write head, wherein the servo write head includes:
a first and second reference write gap, wherein each of the first and second reference write gaps have substantially identical predetermined geometries, and
a track write gap, wherein the track write gap has a predetermined geometry different than the predetermined geometry of the first and second reference write gaps;

means for moving the tape and the servo write head relative to one another; and means for selectively energizing the servo write head such that during energization first and second reference pattern lines and a track pattern line of a servo pattern are simultaneously recorded in the servo track, wherein the first and second reference pattern lines are recorded by the first and second reference write gaps, respectively, across the width of the servo track and the track pattern line is recorded by the track write gap across the width of the servo track.

2. The system of claim 1, wherein the track write gap is located between the first and second reference write gaps.

3. The system of claim 1, wherein the first and second reference write gaps are adjacent one another.

4. The system of claim 1, wherein the first and second reference write gaps are parallel gaps.

5. The system of claim 4, wherein the servo track includes a center line extending along at least the portion of the length of the servo track, and further wherein the reference write gaps are parallel write gaps for recording reference pattern lines in the servo track that are orthogonal to the center line.

6. The system of claim 5, wherein the track write gap is formed at an angle relative to the reference write gaps for recording a pattern line in the servo track that is at an angle with the center line of the servo track.

7. A servo write head apparatus for recording servo information in a servo track, wherein the servo track has a width, the servo write head apparatus comprising:

a head body;

a first and second reference write gap defined in the head body, a length of each of the first and second write gaps allowing for altering the state of the servo track across the width thereof, wherein each of the first and second reference write gaps have substantially identical predetermined geometries; and a track write gap defined in the head body, wherein the track write gap has a length allowing for altering the state of the servo track across the width thereof, the track write gap having a predetermined geometry different than the predetermined geometry of the first and second reference write gaps.

8. The apparatus of claim 7, wherein the track write gap is located between the first and second reference write gaps.

9. The apparatus of claim 7, wherein the first and second reference write gaps are adjacent one another.

10. The apparatus of claim 7, wherein the first and second reference write gaps are parallel gaps.

11. The apparatus of claim 10, wherein the track write gap is formed at an angle relative to the first and second reference write gaps.

12. A system for recording servo track information within a servo track extending along at least a portion of the length of a tape contained in a tape cartridge, wherein the servo track has a track width orthogonal to the length of the tape, the system comprising a tape drive for receiving the tape cartridge, wherein the tape drive is operable to move the tape relative to a servo write head, wherein the servo write head includes:

a first and second reference write gap for use in altering the state of the servo track across the width thereof, wherein each of the first and second reference write gaps have substantially identical predetermined geometries; and a track write gap for use in altering the state of the servo track across the width thereof, the track write gap having a predetermined geometry different than the predetermined geometry of the first and second reference write gaps.

13. The system of claim 12, wherein the tape drive further includes means for selectively energizing the servo write head such that during energization first and second reference pattern lines and a track pattern line of a servo pattern are simultaneously recorded in the servo track, wherein the first and second reference pattern lines are recorded by the first and second reference write gaps, respectively, across the width of the servo track and the track pattern line is recorded by the track write gap across the width of the servo track.

14. The system of claim 13, wherein the track write gap is located between the first and second reference write gaps.

15. The system of claim 13, wherein the first and second reference write gaps are adjacent one another.

16. The system of claim 13, wherein the first and second reference write gaps are parallel gaps.

17. The system of claim 16, wherein the servo track includes a center line extending along at least the portion of the length of the servo track, and further wherein the reference write gaps are parallel write gaps for recording reference pattern lines in the servo track that are orthogonal to the center line.

18. The system of claim 17, wherein the track write gap is formed at an angle relative to the reference write gaps for recording a pattern line in the servo track that is at an angle with the center line of the servo track.

* * * * *